United States Patent
Narkar et al.

(10) Patent No.: US 9,749,837 B2
(45) Date of Patent: *Aug. 29, 2017

(54) LOCATION-BASED IMS SERVER SELECTION

(71) Applicant: T-Mobile USA Inc., Bellevue, WA (US)

(72) Inventors: Vishal Ashok Narkar, Bellevue, WA (US); Mehul Jayant Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,349

(22) Filed: Mar. 26, 2015

(65) Prior Publication Data

US 2015/0201320 A1  Jul. 16, 2015

Related U.S. Application Data (63) Continuation of application No. 12/372,671, filed on Feb. 17, 2009, now Pat. No. 9,036,541.

(51) Int. Cl.
*H04W 8/08* (2009.01)
*H04W 4/18* (2009.01)
(Continued)

(52) U.S. Cl.
CPC ........ *H04W 8/08* (2013.01); *G06F 17/30041* (2013.01); *H04L 65/1073* (2013.01);
(Continued)

(58) Field of Classification Search
CPC ............. H04L 65/1016; H04L 65/1073; H04L 67/1002; H04L 67/1021; H04L 67/18;
(Continued)

(56) References Cited

U.S. PATENT DOCUMENTS 6,067,452 A  5/2000 Alexander
6,563,919 B1  5/2003 Aravamudhan et al.
(Continued)

FOREIGN PATENT DOCUMENTS

EP  1 943 805 A1  7/2008
KR  10-2006-0022937 A  3/2006
(Continued)

OTHER PUBLICATIONS

3GPP TS 23.401 (V8.0.0, Dec. 2007).
(Continued)

*Primary Examiner* — Khoa Huynh
(74) *Attorney, Agent, or Firm* — Knobbe Martens Olson & Bear LLP (57) ABSTRACT

A user location is estimated based on an IP address assigned to the user's device/equipment during registration for multimedia application services that are provided over the IP multimedia subsystems (IMS) network. The latitude and longitude information of the user location is obtained based on the IP address assigned to the user device/equipment. Such information is used to determine an appropriate server (s) for establishing an IP multimedia service session. In some embodiments, a closely located IMS server(s) is selected for proxying, interrogating, providing or delivering IP multimedia services. In this manner, each user device/equipment communicates with IMS servers that are located close to the user and thus, the geographically distributed load among the IMS gateway servers can be achieved.

20 Claims, 5 Drawing Sheets

(51) Int. Cl.
| | |
|---|---|
| *H04W 48/00* | (2009.01) |
| *H04L 29/08* | (2006.01) |
| *H04W 48/18* | (2009.01) |
| *G06F 17/30* | (2006.01) |
| *H04W 4/02* | (2009.01) |
| *H04W 80/10* | (2009.01) |
| *H04L 29/06* | (2006.01) |
| *H04W 64/00* | (2009.01) |
| *H04L 29/12* | (2006.01) |

(52) U.S. Cl.
CPC ...... *H04L 67/1002* (2013.01); *H04L 67/1021* (2013.01); *H04L 67/18* (2013.01); *H04W 4/18* (2013.01); *H04W 48/17* (2013.01); *H04W 48/18* (2013.01); *H04L 61/2007* (2013.01); *H04L 61/609* (2013.01); *H04L 65/1016* (2013.01); *H04W 4/02* (2013.01); *H04W 64/00* (2013.01); *H04W 80/10* (2013.01)

(58) Field of Classification Search
CPC .... H04L 61/609; H04L 61/2007; H04W 4/02; H04W 4/021; H04W 4/022; H04W 4/023; H04W 4/025; H04W 4/18; H04W 8/08; H04W 48/17; H04W 48/18; H04W 64/00; H04W 80/10; G06F 17/30017; G06F 17/30038; G06F 17/30041
See application file for complete search history.

(56) References Cited

U.S. PATENT DOCUMENTS

| | | | |
|---|---|---|---|
| 6,600,738 B1 | 7/2003 | Alperovich | |
| 6,785,726 B1* | 8/2004 | Freeman | G06F 9/542 709/227 |
| 6,788,676 B2 | 9/2004 | Partanen et al. | |
| 7,698,432 B2 | 4/2010 | Short et al. | |
| 7,702,346 B2 | 4/2010 | Choksi | |
| 7,925,762 B1 | 4/2011 | Kauppinen et al. | |
| 8,000,689 B2 | 8/2011 | Featherstone et al. | |
| 8,321,584 B2 | 11/2012 | Dobbins et al. | |
| 8,520,609 B2 | 8/2013 | Singh et al. | |
| 8,594,073 B2 | 11/2013 | Sugimoto et al. | |
| 8,634,788 B2 | 1/2014 | Wright et al. | |
| 2004/0187021 A1 | 9/2004 | Rasanen | |
| 2005/0182829 A1 | 8/2005 | King et al. | |
| 2006/0018291 A1 | 1/2006 | Patel et al. | |
| 2006/0028998 A1 | 2/2006 | Lioy et al. | |
| 2006/0077924 A1 | 4/2006 | Rune | |
| 2006/0077926 A1 | 4/2006 | Rune | |
| 2006/0085543 A1 | 4/2006 | Hrastar et al. | |
| 2006/0104262 A1 | 5/2006 | Kant et al. | |
| 2006/0117020 A1* | 6/2006 | Toebes | H04L 67/1021 |
| 2006/0133317 A1 | 6/2006 | Hurtta | |
| 2007/0030973 A1 | 2/2007 | Mikan | |
| 2007/0060100 A1 | 3/2007 | Watler et al. | |
| 2007/0097997 A1 | 5/2007 | Maclean et al. | |
| 2007/0115934 A1 | 5/2007 | Dauster et al. | |
| 2007/0274255 A1 | 11/2007 | Hung et al. | |
| 2007/0283022 A1* | 12/2007 | Rajko | H04W 60/00 709/227 |
| 2007/0286095 A1* | 12/2007 | Ottinger | 370/254 |
| 2008/0005561 A1 | 1/2008 | Brown et al. | |
| 2008/0160972 A1 | 7/2008 | Haran et al. | |
| 2008/0263632 A1 | 10/2008 | Keon | |
| 2008/0311885 A1 | 12/2008 | Dawson et al. | |
| 2009/0034512 A1 | 2/2009 | Bantukul et al. | |
| 2009/0037595 A1 | 2/2009 | Breau et al. | |
| 2009/0047947 A1 | 2/2009 | Giaretta et al. | |
| 2009/0086705 A1 | 4/2009 | Zisimopoulos | |
| 2009/0161575 A1 | 6/2009 | Zhao et al. | |
| 2009/0298478 A1 | 12/2009 | Tyhurst et al. | |
| 2009/0305671 A1 | 12/2009 | Luft et al. | |
| 2010/0002700 A1* | 1/2010 | Simpson, Jr. | H04L 29/12783 370/392 |
| 2010/0027448 A1 | 2/2010 | Puthiyandyil et al. | |
| 2010/0095317 A1 | 4/2010 | Toebes et al. | |
| 2010/0191604 A1 | 7/2010 | Raleigh | |
| 2010/0234025 A1 | 9/2010 | Julka | |
| 2010/0284278 A1 | 11/2010 | Alanara | |
| 2011/0106946 A1 | 5/2011 | Bao et al. | |

FOREIGN PATENT DOCUMENTS

| | | |
|---|---|---|
| WO | WO 03/084185 A1 | 10/2003 |
| WO | WO 2009/016968 A1 | 2/2009 |
| WO | WO 2009/022750 A2 | 2/2009 |

OTHER PUBLICATIONS

T-Mobile's 3G Speed Reduction Cap, BerryReporter.com <http://www.berryreporter.com/t-mobiles-3g-speed-reduction> [retrieved Aug. 28, 2014].
3rd Generation Partnership Project (3GPP); Technical Specification Group Services and System Aspects; Feasibility Study for Transport and Control Separation in the PS CN Domain (Release 4).
3rd Generation Partnership Project; Technical Specification Group Core Network and Terminals; IP Multimedia (IM) Session Handling; IM Call Model; Stage 2 (Release 8).
3rd Generation Partnership Project; Technical Specification Group Core Network and Terminals; Numbering, Addressing and Identification (Release 8).
3rd Generation Partnership Project; Technical Specification Group Core Network and Terminals; Signalling Flows for the IP Multimedia Call Control Based on SEssion Initiation Protocol (SIP) and Session Description Protocol (SDP); Stage 3 (Release 5).
3rd Generation Partnership Project; Technical Specification Group Services and System Aspects; General Packet Radio Service (GPRS) Enhancements for Evolved Universal Terrestrial Radio Access Network (E-UTRAN) Access (Release 8).
3rd Generation Partnership Project; Technical Specification Group Services and System Aspects; Internet Protocol (IP) based IP Multimedia Subsystem (IMS) Emergency Sessions (Release 7).
3rd Generation Partnership Project; Technical Specification Group Services and System Aspects; IP Multimedia Subsystem (IMS); Stage 2 (Release 8).
3rd Generation Partnership Project; Technical Specification Group Services and System Aspects; One Tunnel Functional Description (Release 7).
GPRS Roaming Guidelines.
Inter-Service Provider IP Backbone Guideline.
RFC2766—Network Address Translation-Protocol ; Translation by G. Tsirtsis and P. Srisuresh.
Supplementary European Search Report dated Sep. 25, 2015, received in European Patent Application No. 11778077.5.
Supplementary European Search Report dated Apr. 21, 2016, received in European Patent Application No. 10744161.0.

* cited by examiner

LOCATION-BASED IMS SERVER SELECTION

CROSS-REFERENCE TO RELATED APPLICATION

This application is a continuation of U.S. patent application Ser. No. 12/372,671, entitled LOCATION-BASED IMS SERVER SELECTION, and filed Feb. 17, 2009, the entirety of which is incorporated herein by reference.

BACKGROUND

Through advancements in wireless access technologies, Internet Protocol (IP) based communications for multimedia applications became available for various types of mobile devices. Examples of such applications include white board discussions, video conferencing, Push to talk over Cellular (PoC), Voice over IP, real-time content sharing including videos/audio files, instant messaging, interactive gaming, and the like. One of the challenges to provide those IP multimedia application services is to provide a good user experience with these rich media applications among a large variety of different computing and mobile devices running over diverse (e.g., different types of wireless, fixed, or the like) networks.

An architectural framework for delivering internet protocol (IP) multimedia to mobile users over various types of wireless and fixed networks to provide the same level of standardization is called the IP Multimedia Subsystem (IMS). Many implementations of IMS employ Session Initiation Protocol (SIP) for session management, including, for example, to establish, modify, and terminate media sessions for various applications. Typically, several different roles of servers or proxies, collectively called Call Session Control Function (CSCF), are used to process SIP signaling packets in the IMS.

Among those servers, an I-CSCF (Interrogating-CSCF) is a server located at the edge of a particular domain. Its IP address is published in the Domain Name System (DNS) of the domain so that remote servers can discover an I-CSCF for a subscriber user, and use the discovered I-CSCF as a forwarding point (e.g., registering) for communication packets to the domain. For example, when a User Equipment (UE) initiates a registration process to the IMS, one I-CSCF is discovered for the UE and the I-CSCF assigns a proper Serving-CSCF (S-CSCF) for delivering IP multimedia services to the UE.

Currently, no consideration is given to the distance between the locations of a UE and its respective I-CSCF during the discovery process. Thus, in some cases, an I-CSCF that is located far from an UE is discovered for the UE even though another I-CSCF that is located closer to the UE is also available. Data packets traveling a long distance can become a major hindrance for providing a good user experience with rich or real-time media applications, especially among a large variety of different computing and mobile devices running over diverse networks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method are provided to select proper network servers to deliver IP multimedia application services that are provided over the IMS. The latitude and longitude information of a user's location is estimated based on the IP address assigned to the user device/equipment. Such information is used to determine appropriate IP multimedia subsystem (IMS) servers that provide the multimedia application services to mobile users. In some embodiments, a closely located IMS server(s), for example, a P-CSCF, an I-CSCF, or an S-CSCF, is selected based on the latitude and longitude information of the user's location. In this manner, each user device communicates with the IMS servers that are located close to the user device and, thus, the overall distance between the user device and the selected S-CSCF is relatively short, thereby providing a good user experience with rich or real-time media applications.

In accordance with an aspect of one embodiment, a system provides a user with an IP multimedia service. The system comprises a location server for providing geographic information associated with an IP address and a plurality of IMS servers. In one aspect, each IMS server is configured to transmit a query to the location server in order to obtain geographic information about the user device after the user device initiates a request for an IP multimedia service. The query includes an IP address of a user device. The IMS server is configured to receive a response including the geographic information about the user device and to identify a region that corresponds to the geographic information about the user device. The IMS server is configured to select a destination server that resides within the identified region.

In accordance with another aspect of one embodiment, a computer implemented method is provided for selecting a destination server in establishing an IP multimedia service session. The method includes obtaining an IP address of a user device that initiates an IP multimedia service and transmitting a query to a location server in order to obtain geographic information about the user device. Subsequently, the location server sends a response to the query including the geographic information about the user device. The geographic information, such as longitude and latitude values associated with the IP address of the user device, is extracted from the response and is used to determine a matching region, where a service area is divided into several regions. Once the matching region is determined, a destination server that resides within the matching region is selected for the user device. The destination server can be a proxy IMS server, an interrogating IMS server or serving IMS server. A table representing a relationship between a region and an IMS server is maintained and referenced when the destination server is being determined.

In accordance with yet another aspect of one embodiment, a computer-readable medium is provided having instructions encoded thereon to select a server that provides IP multimedia services based on the geographic location of a user device. The instructions cause a computing device to obtain an IP address of a user device and to transmit a query to a location server, requesting geographic location information associated with the user device, where the query includes an IP address of the user device. The instructions further cause the computing device to receive a response to the query sent from the location server. The response includes the geographic location information associated with the user device. An IMS server that is located close to the user device is selected and the registration information is forwarded to the IMS server, allowing the user device to establish an IP multimedia service session with the selected IMS server.

DESCRIPTION OF THE DRAWINGS

The foregoing aspects and many of the attendant advantages of claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings is intended as a description of various embodiments of the disclosed technology and is not intended to represent the only embodiments. Generally stated, a user's location is estimated based on an IP address assigned to the user's device/equipment during registration for IP multimedia application services that are provided by the IMS. The latitude and longitude information of the user's location is obtained based on the IP address assigned to the user device/equipment. Such information is then used to determine appropriate IMS server(s) that provides the multimedia application services to mobile users. In some embodiments, closely located IMS servers, such as a P-CSCF, I-CSCF, S-CSCF, or the like, are selected for providing or delivering IP multimedia services. In those embodiments, each user device/equipment communicates with IMS servers that are located close to the user device and, thus, data packets travels a relatively short distance, thereby providing a good user experience with rich or real-time media applications. In one aspect, geographically distributed load balancing can be achieved among the IMS gateway servers.

Figure 1:
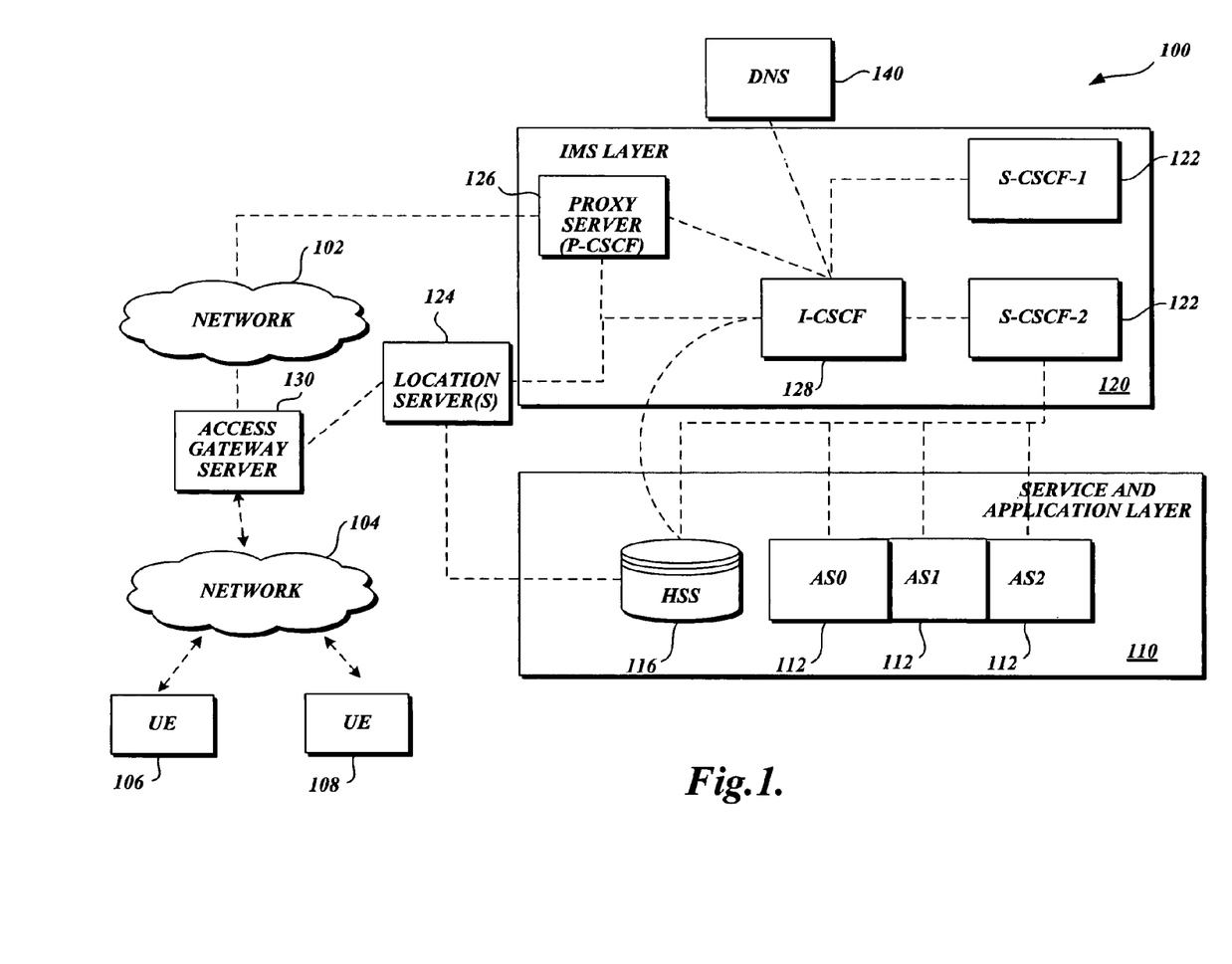
FIG. 1 is a block diagram depicting an exemplary environment where described embodiments of the disclosed technology can be implemented.

Referring now to FIG. 1, the following is intended to provide a general overview of an IMS network environment 100 where some embodiments of the disclosed technology may be implemented. The IMS network environment 100 includes an Application/Service Layer 110, an IMS Layer 120, and one or more access gateway servers 130. The IMS network environment 100 further includes one or more networks 102, 104 such as an IP multimedia and telephony core network, as generally defined by 3GPP and 3GPP2 standards and organizations based on IETF Internet protocols.

As shown in FIG. 1, the Application/Service Layer 110 includes a home subscriber server (HSS) 116, one or more application service (AS) servers 112 and the like. In one embodiment, the HSS 116 may be a central repository/database that contains subscriber- or user-specific data, including, but not limited to, user authorizations, service permissions, user profiles, user preferences, etc. The HSS 116 may be configured to integrate several functions/elements, including authentication and authorization, and the like. The AS servers 112 may host and execute services through the IMS layer 120 using a Session Initiation Protocol (SIP).

The IMS layer 120 includes several types of IMS servers. In general, the IMS layer 120 carries out the primary SIP signaling functions in the IMS network environment 100. As discussed above, the IMS servers may include: a Proxy CSCF (P-CSCF) 126, which is the first point of contact for user devices in a visiting network and routes communications to a home network, an Interrogating-CSCF (I-CSCF) 128 which is the entry point of its domain (e.g., the home network where the I-CSCF is located), and one or more Serving-CSCFs (S-CSCFs) 122 which manage session control functions, and the like.

By way of example, in the IMS layer 120, when a user initiates a call request, the P-CSCF 126 is at the entry point of a network (visitor or home network) where the call request is received from the user. Upon receipt of a request to a call connection, the P-CSCF 126, in turn, sends a call signaling to an I-CSCF 128 of the home network, which determines an S-CSCF 122 responsible for delivering the services to the user (subscriber). Generally stated, the I-CSCF learns the identity of a proper S-CSCF by communicating with the HSS. The S-CSCF executes comprehensive call control based on the services of the user (calling party) and the called party. The S-CSCF may extract the service information of the user from the HSS, which defines the trigger points (TP) of services and pointers to SIP Application Servers (such as AS0, AS1, and AS2 depicted in FIG. 1) where the specific application (service) logic resides.

In one aspect, the IMS layer 120 provides a horizontal control layer that isolates the access network from the Application/Service Layer 120. Generally, the Application/Service Layer 110 does not need to have its own control functions, as the IMS layer 120 is used for providing control functions. This allows third party service providers to easily integrate and deploy their services on the IMS infrastructure.

In some embodiments, the IMS network environment 100 comprises one or more networks that may correspond to a number of IP-based and other networks such as the Internet, DSL networks, public switched telephone networks ("PSTN") and other wireline networks (e.g., SS7-based networks), wireless networks such as those using CDMA, GSM, IEEE 802.11x, and/or UMTS communications or the like, and local area networks. For example, the IP-core network 102 is interfaced with other networks 104 through an access gateway server 130. In one embodiment, an access gateway server 130 may include a Gateway GPRS Support Node (GGSN) for General Packet Radio Service (GPRS), a Packet Data Gateway (PDG) for WiFi, Systems Architecture Evolution Gateway (SAE-GW) or a Packet Data Network Gateway (PDN-GW) for 3GPP Long Term Evolution (LTE), and the like.

In the IMS network environment 100, the user devices or User Equipments (UEs) 106, 108 may be electronic devices capable of communicating with one another over the network(s) in the IMS network environment 100. In some embodiments, the user devices 106, 108 may include computing devices, wire-line connected communication devices such as conventional telephones and enhanced/multimedia-capable telephones, wireless devices such as mobile phones, wireless PDA's, wireless devices with high-speed data transfer capabilities, such as those compliant with "3-G" or "4-G" standards, and the like. As will be well appreciated, the computing/communication devices may include a variety of configurations or forms such as, but not limited to, laptop or tablet computers, personal digital assistants (PDAs), hybrid PDA/mobile phones, mobile phones, smart phones, media players, home messaging hub devices, digital picture frame devices, and the like.

Further, as will be appreciated by one skilled in the art, the user devices 106, 108 communicate with one another over the networks in a standard manner, depending on the particular networks used and the particular type of terminals. Each user device may cover communications frequency bands such as the cellular telephone bands at 850 MHz, 900 MHz, 1800 MHz, and 1900 MHz, the global positioning system (GPS) band, data service bands such as the 3G data communications band (e.g., the Universal Mobile Telecommunications System (UMTS) communication band), the WiFi® (IEEE 802.11) band, the Bluetooth® band and the like. In some embodiments, the user device may include several circuitries that are required to support one or more of following: the General Packet Radio Service (GPRS) standard, Enhanced Digital GSM Evolution (EDGE), or Evolution of GSM (E-GSM) standard, Code Division Multiple Access (CDMA) standard, Wideband Code Division Multiple Access (WCDMA or W-CDMA) standard, Orthogonal Frequency Division Multiplex (OFDM) standard, Time Division Multiple Access (TDMA) standard, and the other standards.

In some embodiments, in order to assist various servers (hereinafter "IMS network servers") in the IMS network environment 100 to estimate a location of a user device 106, 108, a location server(s) 124 may maintain geographic information that is associated with an IP address of the user device 106, 108. For example, the location server 124 may maintain longitude and latitude information about a particular IP address, i.e., the longitude and latitude values (herein after, "Lat/Long information") of a geographic location associated with an IP address.

In some embodiments, in order to obtain geographic location information relating to the user device, an IMS network server (e.g., an access gateway server 130, P-CSCF 126, I-CSCF 128, and HSS 116) may send a query request along with the IP address associated with the user device to the location server. As will be well appreciated, the geographic location information may be any type of information, including, but not limited to, the longitude and latitude values of a geographic location associated with the IP address of the user device. Upon receipt of a query request, the location server extracts the IP-address of the user device from the query request and identifies the Lat/Long information based on the extracted IP-address. It should be understood that some Lat/Long information of IP-addresses may be previously determined or can be determined through some predefined logic implemented in the location server. After identifying the Lat/long information, the location server sends the IMS network server 116, 126, 128, 130 a query response that includes the identified Lat/Long information.

By way of example, assume that a user device 106, 108 discovers a proper P-CSCF via an access gateway server 130. In this example, the access gateway server 130 identifies an IP address of the user device 106, 108 and sends a location query request asking the location server 124 to provide geographic information (e.g., Lat/Long information) that corresponds to the identified IP address. The location server 124 then returns a response including the Lat/Long information that corresponds to the IP address. Once the Lat/Long information of the IP address assigned to the user device is obtained, the access gateway server 130 selects a P-CSCF 128 that is located close to the user, among available P-CSCF servers.

By way of another example, consider that an IMS network server is a P-CSCF 126 to which a user device 106, 108 initiates or requests IP multimedia service by sending a registration request. As with the access gateway server example, in this example, the P-CSCF 126 identifies an IP address of the user device 106, 108 and sends a location query request asking the location server 124 to provide the Lat/Long information that corresponds to the identified IP address. Once the Lat/Long information of the IP address assigned to the user device is obtained, in some embodiments, the P-CSCF selects an I-CSCF 128 that is located close to the user device, among available I-CSCFs, using a table (e.g., TABLE-1 depicted below) or a data store representing a relationship between a region and an I-CSCF server.

Generally, the multiple P-CSCFs, I-CSCFs, and S-CSCFs may spread over different locations within a service provider's coverage area to service subscriber users. In one embodiment, the coverage/service area may be represented on an area map, divided into regions to implement some of the described embodiments. The term "a region," as used herein, refers to a geographical area that is a portion of a service area, defined by boundary information. The boundary information can be defined by maximum and minimum latitude and longitude values. Examples of the regions and their boundary information will be discussed below in connection with TABLE 1 and FIG. 2B.

In one embodiment, the coverage/service area may be divided into several different sets of regions based on a set of criteria or rules. For example, a set of regions are defined so that at least one P-CSCF and I-CSCF can be mapped within each region based on its geographic location. Another set of regions may be defined so that a single S-CSCF is be mapped within one region. As will be well appreciated, the regions can be redefined anytime when it is appropriate and the IMS network server may update the information about the regions accordingly. The regions can be redefined if there are changes in locations of the IMS servers (e.g., P-CSCFs, I-CSCFs, S-CSCFs) or the like. In some instances, one or more IMS servers can be added or removed to/from one region because of business/public policy reasons, load balancing, or the like.

In addition, in some embodiments, a set of criteria or rules is defined to provide conditions as to how to define or redefine regions. For example, one criterion may be that the area is divided into regions such that each region contains one particular IMS server that has a physical presence within the region. Another criterion may be that, if the number of end-user subscribers and population reaches a threshold, regions need to be redefined by, for example, dividing one region into two or more regions and adding more IMS servers. As such, a country or a continent can be divided into several regions based on a set of predefined criteria and the regions can be readily reflected on a map.

For ease of discussion, in the described embodiments, it is assumed that each region is defined to assist an IMS network server to select an appropriate IMS server for a given user device based on the Lat/Long information of the user device. As such, in one embodiment, each IMS network server maintains a table representing a relationship between region information and an IMS server IP address.

Figure 2A:
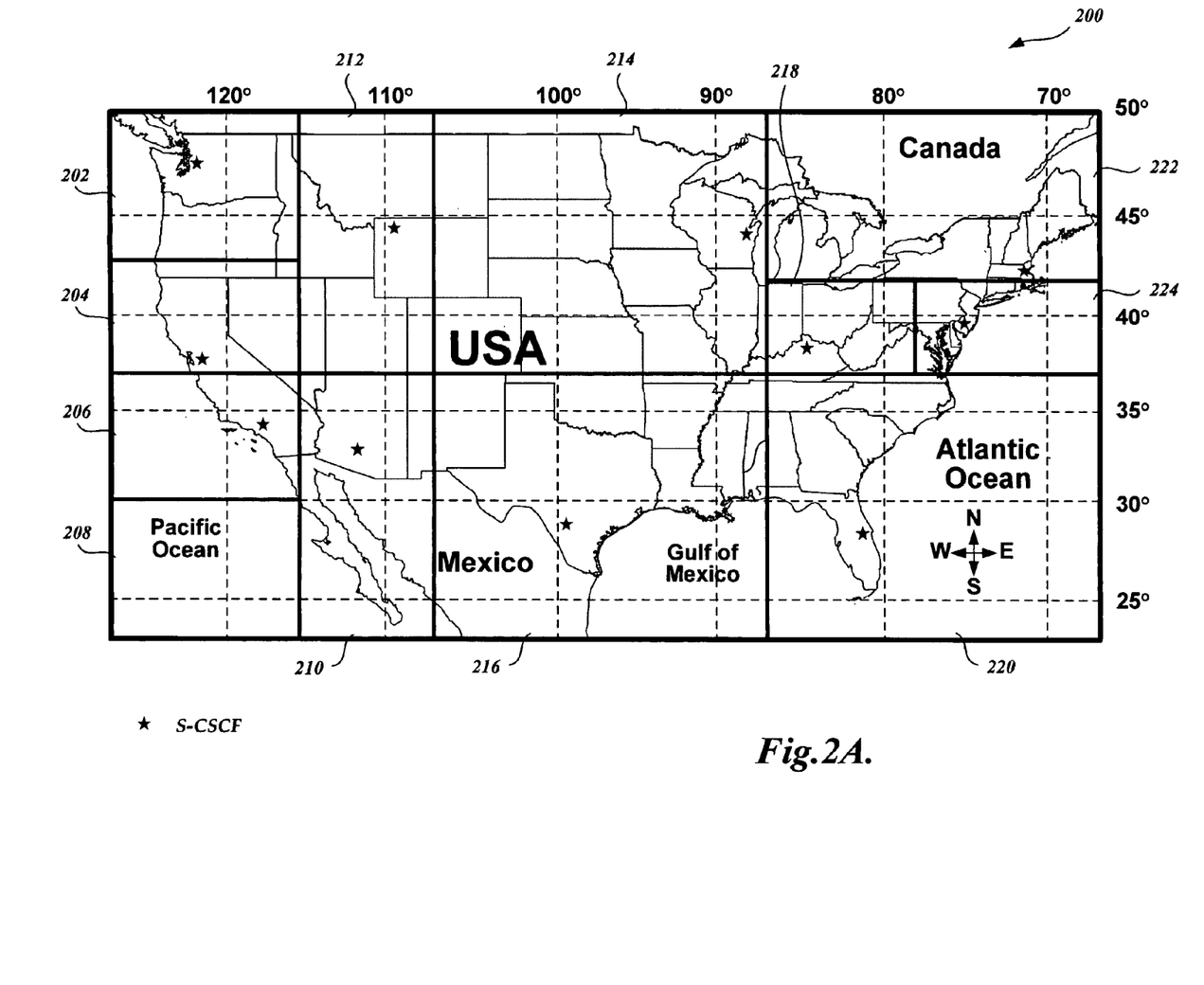
FIGS. 2A and 2B are schematic diagrams depicting various IMS servers which are geographically distributed.
Figure 2B:
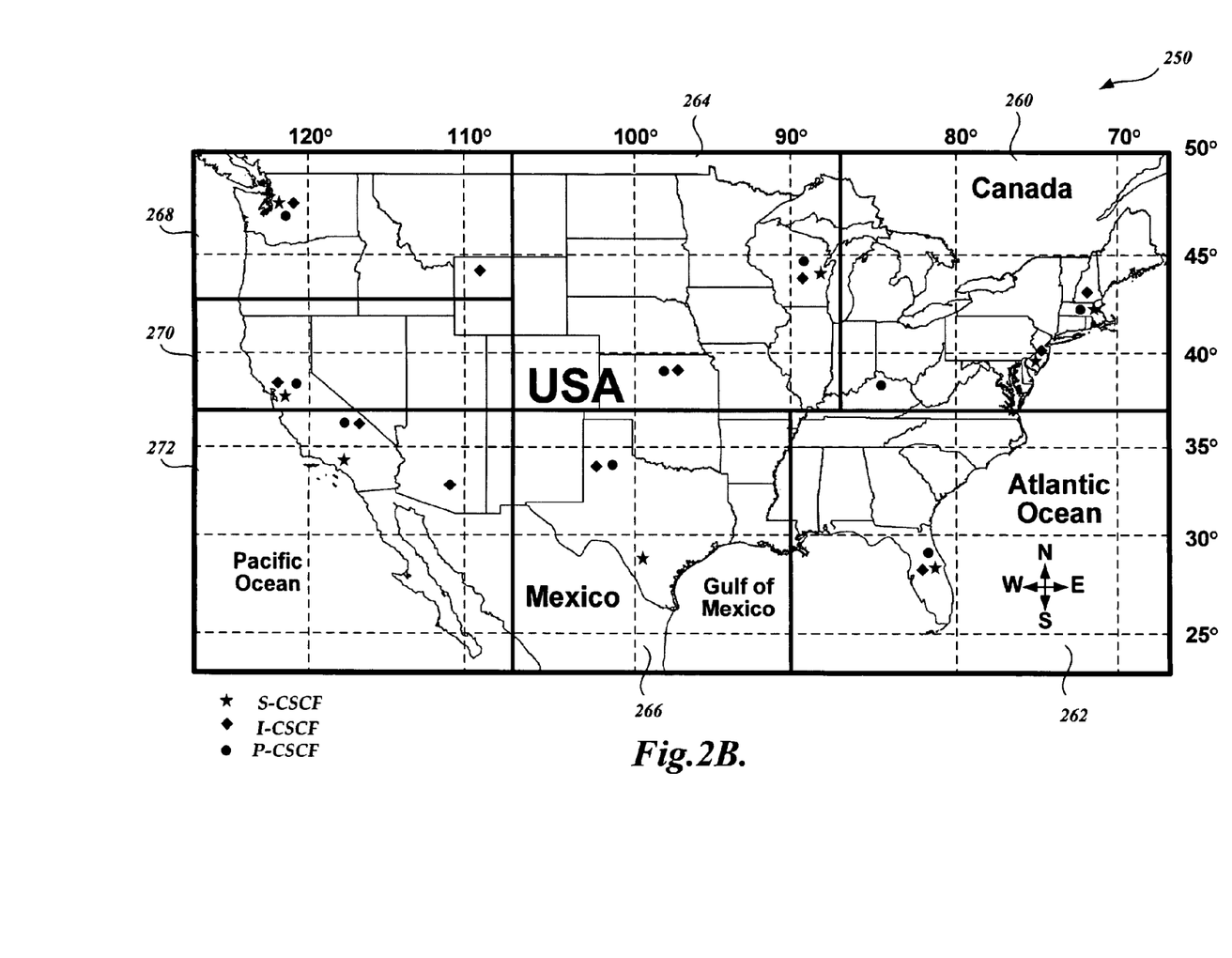

Referring now to FIGS. 2A and 2B, schematic diagrams 200, 250 depict a map of an area that is divided into a first set of regions 202-224 or a second set of regions 260-272. As shown, each region 202-224, 260-272 can be defined by its boundary information (e.g., maximum and minimum latitude and longitude values). In some embodiments, the regions are predefined in any IMS network server where the information about the regions is stored and used to select another server for communication.

As will be appreciated one of ordinary skill in the art, a table representing a relationship between a region and an P-CSCF IP address may be maintained in an access gateway server 130, a table representing a relationship between a region and an I-CSCF IP address may be maintained in a P-CSCF 126, a table representing a relationship between a region and S-CSCF IP address may be maintained in HSS 116 or I-CSCF 128, and the like. Additionally or alternatively, such tables or data stores can be remotely or centrally maintained but readily accessible by the IMS network servers 116, 126, 128, 130.

By way of example, an access gateway server or a P-CSCF maintains a table or a database representing a relationship between a region and an IMS Server IP address along with geographic information of each region. For example, consider the following simplified table representing the relationships between regions and IP addresses where the regions are reflected on a map 250 as depicted in FIG. 2B. The exemplary table (a region and IMS Server) is described as follows:

TABLE 1

| Region | Max Latitude | Min Latitude | Max Longitude | Min Longitude | IMS Server IP address (I-CSCF, P-CSCF, or S-CSCF) |
|---|---|---|---|---|---|
| 260 | 50 | 38 | 88 | 68 | 000.xxx.111 |
|  |  |  |  |  | 000.xxx.222 |
| 262 | 38 | 24 | 90 | 68 | 000.xxx.333 |
| 264 | 50 | 38 | 105 | 88 | 000.xxx.440 |
|  |  |  |  |  | 000.xxx.430 |
| 266 | 38 | 24 | 105 | 90 | 000.xxx.555 |
| 268 | 50 | 43 | 105 | 125 | 000.xxx.666 |
| ... | ... | ... | ... | ... | ... |

As shown, Region 260, defined by its boundary information (50, 38, 88, 68), corresponds to the first entry of the above-depicted table. Region 260 includes two IMS servers, each having an IP address, 000.xxx.111 and 000.xxx.222 respectively. Likewise, Region 262, defined by its boundary information (38, 24, 90, 68), corresponds to the second entry. An IMS server having an IP address, 000.xxx.333, resides in Region 262, and so on.

In one embodiment, a HSS maintains a different table or a database representing a relationship between a region and S-CSCF information, which will be discussed in detail below in connection with TABLE 2 and FIG. 3. It should be understood that the above-mentioned table is merely an example, cannot be construed as limiting the scope of the subject matter. For example, a region may be defined to have various different shapes, such as a polygon defined by multiple longitude/latitude points, or the like.

Figure 3:
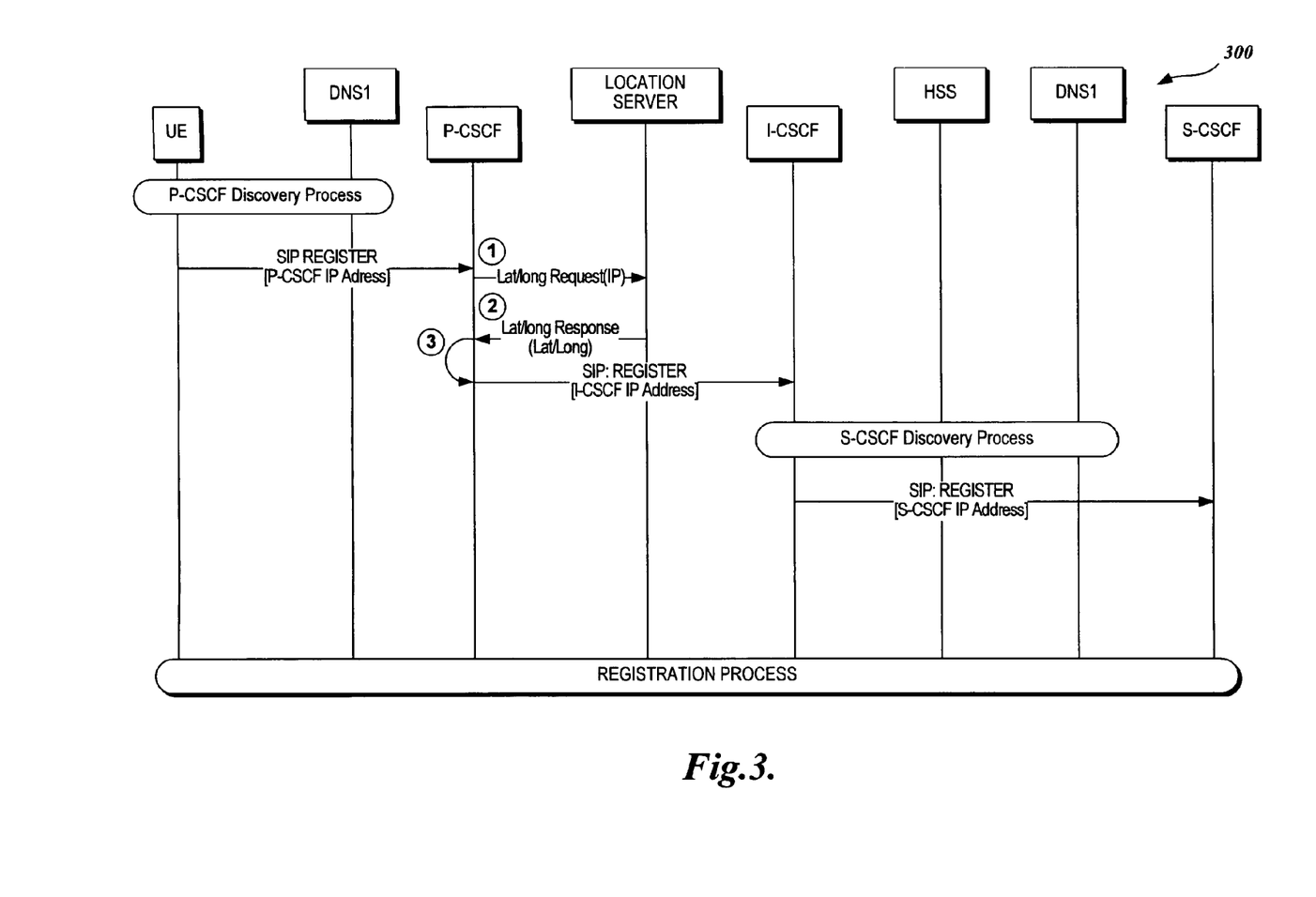
FIG. 3 is a functional diagram depicting interactions among various components of the exemplary environment shown in FIG. 1 in accordance with some embodiments of the disclosed technology.

Referring now to FIG. 3, a functional diagram 300 depicts the interactions among various components of the IMS network environment 100 shown in FIG. 1 in accordance with some embodiments. As discussed previously, the IMS layer 120 is generally responsible for the registration, security, and call/service control logic for providing multimedia application services to subscriber users. In the IMS layer 120, each IMS server component (e.g., P-CSCF, I-CSCF, S-CSCF, etc.) operates in accordance with its responsibilities during user registration and call/service control. As will be understood by one skilled in the art, one IMS server can have multiple responsibilities. For example, one server can operate as both an I-CSCF and S-CSCF.

By way of example, when a user device initiates or requests an IP multimedia service, a registration request is sent to a P-CSCF through an access gateway server. In one embodiment, the user device obtains its IP connectivity through an "IP connectivity Access network" that includes an access gateway server, when the user device initiates or requests an IP multimedia service. A term "IP connectivity Access network," as used herein, refers to the collection of network entities and interfaces that provides the underlying IP transport connectivity between the user device and the IMS entities. An example of an IP-Connectivity Access Network is the GPRS core network with GERAN and/or UTRAN radio access networks.

After obtaining the IP connectivity, the user device has an assigned IP address. Next, a P-CSCF discovery process is performed.

In some embodiments, in order to discover a proper P-CSCF for the user device, a Lat/Long query including an IP address of the user device may be sent to the location server. As discussed above in connection with FIG. 1, the location server maintains the geographic information about an IP address, i.e., Lat/Long information associated with an IP address.

Upon receipt of a query request, the location server extracts the IP-address of the user device from the query request and identifies the Lat/Long information based on the extracted IP-Address. It should be understood that some Lat/Long information of IP-addresses may be previously determined or can be determined through some predefined logic implemented in the location server. After identifying the Lat/Long information, the location server sends the access gateway server a query response that includes the identified Lat/Long information.

Upon receipt of the response from the location server, the access gateway server extracts the Lat/Long information from the response. Subsequently, the access gateway server identifies a region that includes the user device's location estimated based on the Lat/Long information. As discussed previously, a region may be a geographical boundary defined by maximum and minimum latitude and longitude values. Thus, the Lat/Long information of the user device may be compared with the maximum and minimum latitude and longitude values of each region. As depicted in the above TABLE 1, the access gateway server uses a table or data store representing a relationship between a region and a P-CSCF server along with the boundary information of the region.

After a P-CSCF is discovered for the user device, the user device sends registration information to the discovered P-CSCF. Upon receipt of the register information, such as the SIP register message, the P-CSCF identifies the IP address of the user device from the register information and generates a query request for obtaining geographic location information relating to the user device. Then, the P-CSCF sends a query request along with the IP address of the user device to the location server. Upon receipt of a query request, the location server identifies the Lat/Long information based on the IP-Address included in the query request and sends the P-CSCF a query response that includes the identified Lat/Long information. The above example can be implemented with modification of SIP header specific to the operator's requirements.

Upon receipt of the response from the location server, the P-CSCF extracts the Lat/Long information from the response. As depicted in the above TABLE 1, the P-CSCF includes a table or data store representing a relationship between a region and IMS servers (e.g., I-CSCF servers) along with the boundary information of the region. The Lat/Long information of the user device may be compared with the maximum and minimum latitude and longitude values of each region. In some embodiments, the P-CSCF determines, based on the table, the region that includes the user's estimated location and then determines one or more I-CSCFs that correspond to the region. In some instances, there may be several I-CSCFs residing within one region. In those instances, the P-CSCF may identify an I-CSCF that is located closer to the user's estimated location through communication with the location server.

After the P-CSCF selects an I-CSCF for the user device based on the Lat/Long information of the user device, the P-CSCF forwards the registration information (e.g., P-CSCF address/name, Public User Identity, Private User Identity, P-CSCF network identifier, UE IP address) to the selected I-CSCF. In one embodiment, the I-CSCF may provide the HSS with the information relating to the user device, for example, UE IP address, Device Type and the like, so that the HSS can check whether the particular user (operating the user device) is already registered or authorized to use certain IMS application services. As such, the HSS may indicate whether the user is allowed to register in that P-CSCF network (identified by the P-CSCF network identifier), or to subscribe the requested IP media service according to user profile information. The P-CSCF network identifier is a string that identifies the home network that is the network where the P-CSCF is located (e.g., the P-CSCF network identifier may be the domain name of the P-CSCF network).

Next, the I-CSCF performs an S-CSCF discovery process. In some embodiments, the I-CSCF discovers, through interacting with the HSS, a proper S-CSCF to deliver services for the user device. In those embodiments, the HSS may return the proper S-CSCF's name, or the S-CSCF capabilities, if it is necessary to select a new S-CSCF. The I-CSCF, using the name of the S-CSCF, may determine the IP address of the S-CSCF through a DNS server.

In some cases, one or more S-CSCFs having requested capabilities may be available for providing the services to the subscriber. In such cases, an S-CSCF located physically closer to the user device than other S-CSCFs may be selected by the HSS. In those cases, the HSS obtains the Lat/Long information of the user device from a location server by exchanging a query request including the IP address of the user device and a query response.

As will be discussed above, the HSS may use a mapping table to select, among several available S-CSCFs for the requested service, an S-CSCF that is located close to the user device. For example, consider the following simplified table depicting a mapping of a region and information of its corresponding S-CSCF (e.g., IP address, S-CSCF's capabilities, etc.) where the regions are reflected on a map 200 as depicted in FIG. 2A. The exemplary table (a region and S-CSCF table) is described as follows:

TABLE 2

| Region | Max Latitude | Min Latitude | Max Longitude | Min Longitude | S-CSCF IP address | S-CSCF Capabilities |
|---|---|---|---|---|---|---|
| 202 | 50 | 42 | 125 | 115 | 000.xxx.111 | AS0, AS1 |
| 204 | 42 | 38 | 125 | 115 | 000.xxx.222 | AS1 |
| 206 | 38 | 30 | 125 | 115 | 000.xxx.333 | AS0, AS1, AS2 |
| 208 | 30 | 24 | 125 | 115 | 000.xxx.332 | AS0, AS1 |
| 210 | 50 | 38 | 115 | 118 | 000.xxx.444 | AS1, AS2 |
| 212 | 38 | 24 | 115 | 118 | 000.xxx.555 | AS2 |
| 214 | 50 | 38 | 108 | 88 | 000.xxx.666 | AS1, AS2 |
| 216 | 38 | 24 | 108 | 88 | 000.xxx.777 | AS0, AS2 |
| ... | ... | ... | ... | ... | ... | ... |

As shown, Region 202, defined by its boundary information (50, 42, 125, 115), corresponds to the first entry of the region and S-CSCF table. Region 202 includes an S-CSCF that has its IP address, 000.xxx.111 and has capabilities of AS0 and AS1. Likewise, Region 204, defined by its boundary information (42, 38, 125, 115), corresponds to the second entry. An S-CSCF having its IP address, 000.xxx.222 and capability of AS1 resides in Region 204 and so on. Consider a scenario where a user has requested a Push-to Talk service that AS2 can provide and the location of the user device is estimated within a Region 204. The HSS looks up the table and select an S-CSCF with 000.xxx.333 that is located in a region 206 close to the user device among S-CSCFs having the AS2 (Push-to Talk) capability after verifying the user's subscription profile.

In some embodiments, the HSS returns the S-CSCF capabilities and the user's service validation information and the I-CSCF selects a new S-CSCF based on the capabilities returned. In one embodiment, the I-CSCF identifies the IP address of the user device from the register information and generates a query request for obtaining geographic location information relating to the user device. Then, as with an access gateway or a P-CSCF discussed above, the I-CSCF obtains the Lat/Long information based on the IP-Address from the location server by exchanging a request and response. The I-CSCF consults with a region and IMS server table, for example, TABLE-1 above, to select a proper S-CSCF that is located close to the user device.

After a proper S-CSCF is selected by the HSS or the I-CSCF, the I-CSCF assigns the selected S-CSCF to the user device and forwards the register information (P-CSCF address/name, Public User Identity, Private User Identity, P-CSCF network identifier, UE IP address) to the selected S-CSCF. Subsequently, the S-CSCF stores the registration information such as the P-CSCF address/name, or the like. In the Application/Service Layer 110, the HSS stores the S-CSCF name for that user and the user information is passed from the HSS to the S-CSCF, which is used to access the platform(s) used for service control while the user is registered at this S-CSCF.

After the proper S-CSCF is determined for the user device, the SIP registration between the user device and the S-CSCF is established. After the successful registration, the application level registration is performed. The process of the application level registration is well known to one of skill in the art and thus the detailed description about the process of the application level registration is omitted in the description.

Figure 4:
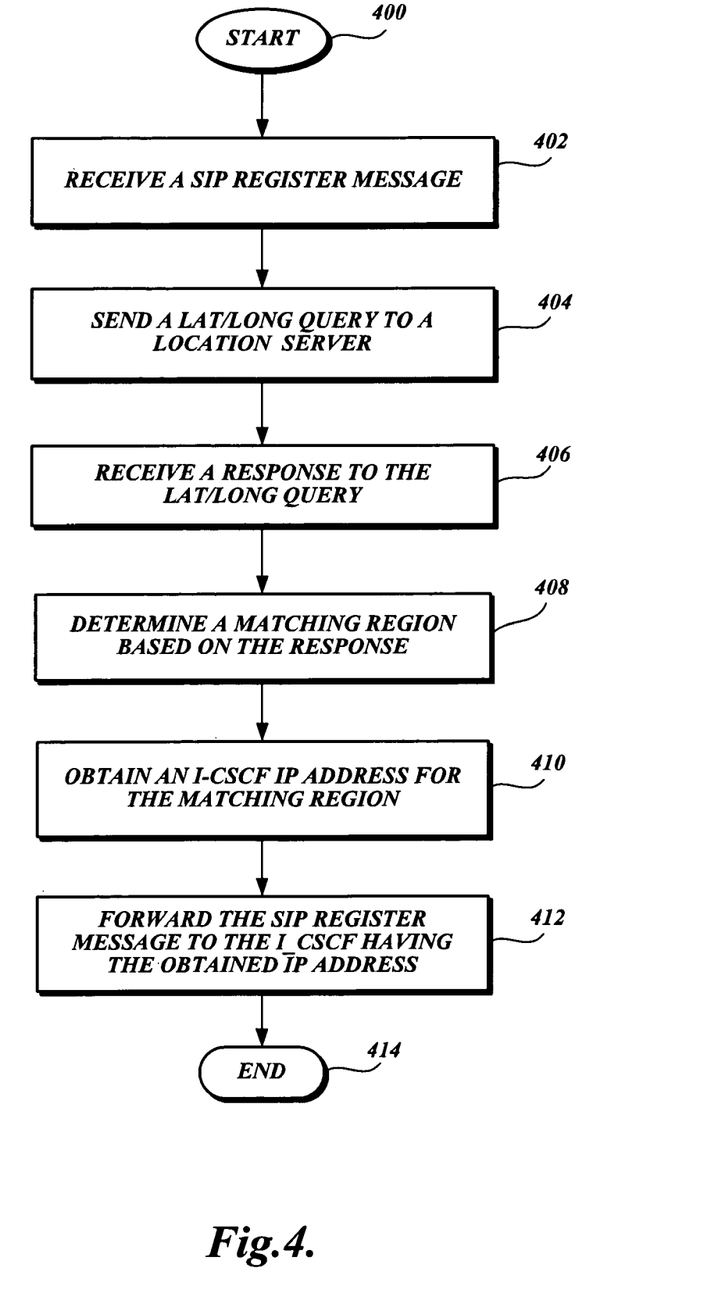
FIG. 4 is a block diagram depicting an IMS server selection routine in accordance with some embodiments of the disclosed technology.

Referring now to FIG. 4, a flow diagram depicts an IMS server selection routine 400 in accordance with some embodiments of the described technology. For ease of discussion, it is assumed that a user is operating a user device to request IP multimedia application service through a proper access gateway server and a P-CSCF has been discovered as discussed above in connection with the diagram depicted in FIG. 3.

The routine 400 begins with block 402 where the P-CSCF receives a SIP register message from the user device. As discussed above, when a user device initiates IP multimedia application services, the user device is required to register with I/S-CSCFs through Session Interface Protocol. At block 404, upon receipt of a SIP register message, the P-CSCF sends a Lat/Long query to a location server. The P-CSCF extracts an IP address of the user device and generates the Lat/Long query including the IP address. At block 406, the P-CSCF receives, from the location server, a response to the query. As discussed above, the location server may maintain the Lat/Long information about a particular IP address. When a user device initiates or requests IP multimedia service by sending a registration request to a proxy P-CSCF, the P-CSCF identifies an IP address of the user device and sends a location query request asking the location server to provide the longitude/latitude information that corresponds to the identified IP address. The location server then returns a response including the Lat/Long information that corresponds to the IP address.

At block 408, the P-CSCF determines a matching region based on Lat/Long information contained in the response. In one embodiment, the P-CSCF maintains a table/database representing a relationship between a region and IMS server (s). Alternatively, the table/database representing a relationship between a region and IMS server(s) may be stored and maintained in a remote data store which the P-CSCF can access. After the P-CSCF identifies the Lat/Long information of the IP address, the P-CSCF compares the information to find a region that contains the location represented by the Lat/Long information.

At block 410, the P-CSCF determines an I-CSCF from the table based on the region information. In one embodiment, the P-CSCF obtains an IP address of an I-CSCF that is located in the region from a table representing a relationship between a region and the I-CSCF. At block 412, the P-CSCF forwards the SIP register message to the I-CSCF associated with the obtained IP address. The routine 400 then terminates at block 414.

It should be well understood that the routine 400 described above with reference to FIG. 4 does not show all of the functions and steps performed within the IMS network environment 100. Instead, the routine 400 generally describes the processes performed in a P-CSCF to determine an I-CSCF that is located close to a user device based on the Lat/Long information of the user device. It is noted that similar steps can be implemented in other IMS network servers so that each IMS network server can select a next destination server to eventually establish an IP multimedia session. The IMS network server may consult a table discussed above in connection with FIGS. 2A, 2B, and 3 when selecting a next destination server. Accordingly, those skilled in the art and others will recognize that some functions/steps and/or exchanges of data described above may be performed in a different order, omitted/added, or otherwise varied without departing from the scope of the claimed subject matter.

In some embodiments, the IMS network servers may obtain the Lat/Long information of a user device from sources other than the location server. For example, a user device equipped with a built-in GPS unit may be configured to obtain its Lat/Long information using the GPS unit and to transmit the Lat/Long information to the P-CSCF.

While illustrative embodiments have been illustrated and described, it will be appreciated that various changes can be made therein without departing from the scope of the invention.

What is claimed is:

1. A subsystem, the subsystem comprising a plurality of communicatively connected Internet Protocol (IP) multimedia subsystem (IMS) servers for providing IP multimedia services, wherein the plurality of IMS servers each include memory that stores data and wherein the subsystem is configured to execute computer-executable instructions that cause the subsystem to:
determine location information associated with a user device that initiates a request for an IP multimedia service;
identify a matching region for the user device by comparing the location information associated with the user device against one or more regions of the subsystem based, at least in part, on boundary information defining the one or more regions, wherein the boundary information is independent from IP addresses;
select a first IMS server that resides within the matching region;
forward information related to the request for the IP multimedia service to the selected first IMS server; and
select, by the selected first IMS server, a second IMS server for providing the IP multimedia service to the user device.

2. The subsystem of claim 1, wherein the boundary information defining the one or more regions corresponds to geographic boundary information.

3. The subsystem of claim 2, wherein the geographic boundary information includes at least one of a longitude or latitude value.

4. The subsystem of claim 1, wherein the subsystem is configured to executed computer-executable instructions that further cause the subsystem to obtain a table that represents relationships between at least a subset of the one or more regions as defined by the boundary information and at least a subset of the plurality of IMS servers.

5. The subsystem of claim 4, wherein the table corresponds to a single type of IMS servers.

6. The subsystem of claim 4, wherein the table further indicates capacity information associated with individual IMS servers included in the table.

7. The subsystem of claim 6, wherein the subsystem is configured to execute computer-executable instructions that further cause the subsystem to select the first IMS server based on the capacity information.

8. The subsystem of claim 1, wherein the one or more regions are further defined based on at least one of a quantity, type, or presence of IMS servers within individual regions of the one or more regions.

9. A computer-implemented method for selecting servers associated with Internet Protocol (IP) multimedia service, comprising:
determining location information associated with a user device that initiates a request for an IP multimedia service;
identifying a matching region for the user device by comparing the location information associated with the user device against one or more regions associated with the IP multimedia service based, at least in part, on boundary information defining the one or more regions, wherein the boundary information is independent from IP addresses;
selecting a first IP multimedia subsystem (IMS) server that resides within the matching region;
forwarding information related to the request for the IP multimedia service to the selected first IMS server; and
selecting, by the selected first IMS server, a second IMS server for providing the IP multimedia service to the user device.

10. The method of claim 9, wherein the one or more regions are further defined based on at least one of a quantity, type, or presence of IMS servers within individual regions of the one or more regions.

11. The method of claim 10, wherein the type of IMS servers corresponds to an Interrogating-Call Session Control Function (I-CSCF), Proxy-Call Session Control Function (P-CSCF), or Serving-Call Session Control Function (S-CSCF).

12. The method of claim 9 further comprising causing re-defining of the one or more regions in response to a change of location of the one or more IMS servers.

13. The method of claim 9 further comprising causing re-defining of the one or more regions based, at least in part, on a number of end-user subscribers associated with the IP multimedia service.

14. The method of claim 9, wherein the location information associated with the user device corresponds to geographic information about the user device.

15. The method of claim 14, wherein the geographic information includes longitude and latitude values associated with the user device.

16. The method of claim 9 further comprising obtaining the location information associated with the user device based, at least in part, on a network identifier associated with the user device.

17. The method of claim 16, wherein the network identifier corresponds to an Internet Protocol (IP) address.

18. A non-transitory computer-readable medium storing computer executable instructions that when executed by a processor perform operations comprising:
 determining location information associated with a user device that initiates a request for an Internet Protocol (IP) multimedia service;
 identifying a matching region for the user device by comparing the location information associated with the user device against one or more regions associated with the IP multimedia service based, at least in part, on boundary information defining the one or more regions, wherein the boundary information is independent from IP addresses;
 selecting a first IP multimedia subsystem (IMS) server that resides within the matching region;
 forwarding information related to the request for the IP multimedia service to the selected first IMS server; and
 selecting, by the selected first IMS server, a second IMS server for providing the IP multimedia service to the user device.

19. The non-transitory computer-readable medium of claim 18, wherein identifying the matching region comprises identifying the matching region that includes the location of the user device.

20. The non-transitory computer-readable medium of claim 18, wherein the second IMS server resides within a second matching region, wherein the first IMS server and the second IMS server correspond to different IMS server types.

* * * * *